(12) United States Patent
Kavanaugh

(10) Patent No.: US 7,614,179 B2
(45) Date of Patent: Nov. 10, 2009

(54) QUICK RELEASE LINE ATTACHMENT

(75) Inventor: Patrick J. Kavanaugh, E3275 Benrud La., Eau Claire, WI (US) 54701-8584

(73) Assignee: Patrick J. Kavanaugh, Eau Claire, WI (US)

( * ) Notice: Subject to any disclaimer, the term of this patent is extended or adjusted under 35 U.S.C. 154(b) by 0 days.

(21) Appl. No.: 10/931,708

(22) Filed: Sep. 1, 2004

(65) Prior Publication Data

US 2006/0042151 A1    Mar. 2, 2006

(51) Int. Cl.
*A01K 95/00* (2006.01)
(52) U.S. Cl. .................... 43/44.91; 43/44.9; 24/130
(58) Field of Classification Search ............... 43/44.91, 43/44.89, 44.87, 44.9, 44.92, 44.95; 24/130, 24/129 R, 127

See application file for complete search history.

(56) References Cited

U.S. PATENT DOCUMENTS

| 326,134 | A | * | 9/1885 | McNeal | 43/44.9 |
|---|---|---|---|---|---|
| 399,866 | A | * | 3/1889 | Gage | 43/44.89 |
| 418,995 | A | * | 1/1890 | Tufts | 43/44.95 |
| 419,574 | A | * | 1/1890 | Vasseur | 43/44.92 |
| 598,342 | A | * | 2/1898 | Hawkins | 24/129 R |
| 676,724 | A | * | 6/1901 | McCargar et al. | 43/44.91 |
| 822,694 | A | * | 6/1906 | Shepherd | 43/44.89 |
| 887,520 | A | * | 5/1908 | Rehling | 24/129 R |
| 1,098,018 | A | * | 5/1914 | Cook | 43/44.91 |
| 2,452,175 | A | * | 10/1948 | Atkins | 24/129 R |
| 2,599,973 | A |   | 6/1952 | Bujaky |   |
| 2,601,736 | A | * | 7/1952 | Fisher | 43/44.91 |
| 2,733,538 | A | * | 2/1956 | Alimas | 43/44.89 |
| 2,753,653 | A | * | 7/1956 | Osterberg | 43/44.91 |
| 2,754,616 | A | * | 7/1956 | Law | 43/44.91 |
| 2,787,079 | A | * | 4/1957 | Wilson | 43/44.91 |
| 2,791,060 | A | * | 5/1957 | Kender | 43/44.9 |
| 2,810,172 | A | * | 10/1957 | Wiglesworth | 24/130 |
| 2,904,924 | A | * | 9/1959 | Tashiro | 43/44.89 |
| 2,908,991 | A | * | 10/1959 | Cummings et al. | 43/44.91 |
| 2,958,153 | A | * | 11/1960 | Yerman et al. | 43/44.91 |
| 3,019,545 | A | * | 2/1962 | Long | 43/44.89 |
| 3,043,043 | A | * | 7/1962 | Parry | 43/44.87 |
| 3,104,487 | A | * | 9/1963 | Havel | 43/44.9 |
| 3,107,451 | A | * | 10/1963 | Sitzler et al. | 43/44.87 |
| 3,192,662 | A | * | 7/1965 | Hoyle | 43/44.91 |
| 3,197,914 | A | * | 8/1965 | Beverly | 43/44.91 |
| 3,241,262 | A | * | 3/1966 | Beverly | 43/44.91 |
| 3,460,285 | A | * | 8/1969 | Perkins | 43/44.9 |

(Continued)

FOREIGN PATENT DOCUMENTS

CA    2196706 A1  *  8/1998

(Continued)

Primary Examiner—Darren W Ark
(74) Attorney, Agent, or Firm—Westman, Champlin & Kelly, P.A.

(57) ABSTRACT

An attachment device attachable to a string, rope, cord or other flexible line that remains in a fixed position on the line without knotting the line or clamping the device to the line. The attachment device is quickly attached and removed without the need for additional tools to attach or release the device from the line. The device includes a secondary attachment to allow a second device to be permanently attached to the attachment device, allowing the second device to be quickly attached and released from a line.

10 Claims, 8 Drawing Sheets

U.S. PATENT DOCUMENTS

| | | | | |
|---|---|---|---|---|
| 3,638,347 | A * | 2/1972 | Kochevar | 43/44.89 |
| 3,782,025 | A * | 1/1974 | Kochevar | 43/44.9 |
| 3,852,907 | A * | 12/1974 | Haught | 43/44.9 |
| 4,145,833 | A * | 3/1979 | Ratte | 43/44.89 |
| 4,351,128 | A | 9/1982 | Sivertsen | |
| 4,459,775 | A * | 7/1984 | Ratte | 43/44.89 |
| 4,561,205 | A * | 12/1985 | Kessler | 43/44.87 |
| 4,563,831 | A * | 1/1986 | Gibney | 43/44.91 |
| 4,615,135 | A * | 10/1986 | Swinbanks et al. | 43/44.9 |
| 4,649,664 | A * | 3/1987 | Mahan | 24/130 |
| 4,780,981 | A * | 11/1988 | Hayward et al. | 43/44.89 |
| 4,891,903 | A * | 1/1990 | Wymore | 43/44.89 |
| 4,944,107 | A * | 7/1990 | Wymore | 43/44.89 |
| 4,949,645 | A * | 8/1990 | Hayward et al. | 43/44.9 |
| 5,239,770 | A * | 8/1993 | Kohus | 43/44.91 |
| 5,381,622 | A * | 1/1995 | Tregre | 43/44.9 |
| 5,435,095 | A * | 7/1995 | Crumrine et al. | 43/44.9 |
| 5,588,248 | A * | 12/1996 | Cornell et al. | 43/44.9 |
| 5,946,849 | A * | 9/1999 | Brown | 43/44.89 |
| 5,987,710 | A * | 11/1999 | Paul et al. | 24/130 |
| 6,044,527 | A * | 4/2000 | Ishida et al. | 24/129 R |
| 6,094,783 | A * | 8/2000 | Parsons | 24/130 |
| 6,163,936 | A * | 12/2000 | Benoit | 24/130 |
| 6,170,191 | B1 * | 1/2001 | Laney | 43/44.9 |
| 6,325,136 | B1 | 12/2001 | Ratte et al. | |
| 6,497,069 | B1 * | 12/2002 | Acworth et al. | 43/44.9 |
| 6,618,910 | B1 * | 9/2003 | Pontaoe | 24/115 H |
| 6,651,479 | B2 | 11/2003 | Ratte | |
| 6,712,379 | B2 * | 3/2004 | Graham et al. | 24/129 R |
| 2002/0178646 | A1 * | 12/2002 | Ratte | 43/44.9 |

FOREIGN PATENT DOCUMENTS

| | | | |
|---|---|---|---|
| EP | 105674 A2 | * | 4/1984 |
| GB | 2139861 A | * | 11/1984 |
| GB | 2170682 A | * | 8/1986 |
| GB | 2179664 A | * | 3/1987 |
| GB | 2191373 A | * | 12/1987 |
| JP | 9-299000 A | * | 11/1997 |
| JP | 2001-86910 A | * | 4/2001 |

* cited by examiner

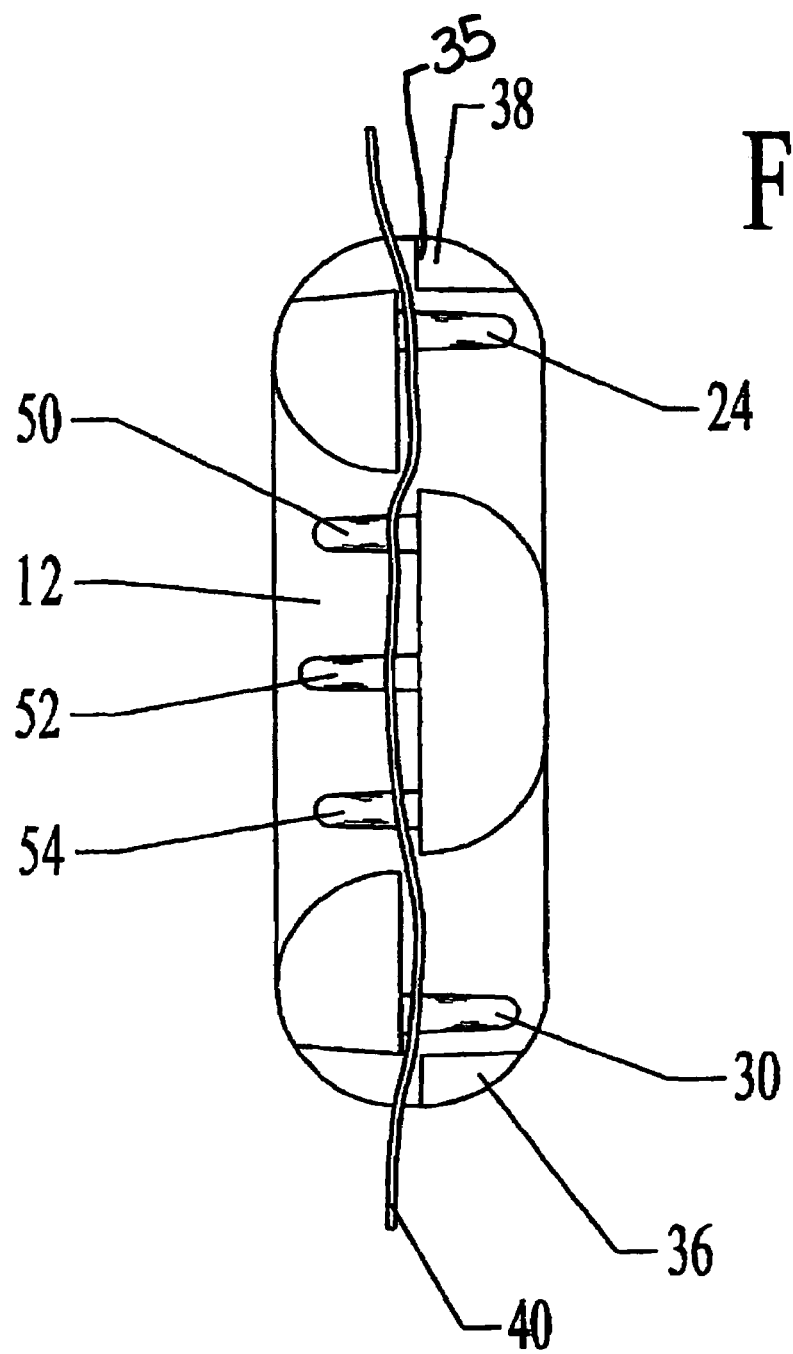

QUICK RELEASE LINE ATTACHMENT

FIELD OF THE INVENTION

This invention relates generally to devices attachable to a string, rope, cord or other flexible line. More particularly, the attachment device of the present invention is attachable to and remains in a fixed position on a line without knotting the line, clamping the device to the line, or wedging against the line and device. Without limitation, the attachment device of the present invention is particularly well suited to attach a weight, bobber, or other articles to a fishing line.

BACKGROUND OF THE INVENTION

Over the years, various devices have been constructed for attachment to a line without threading the line through a fixed hole in the device. In many situations a user may wish to rig a line with one or more objects attached to the ends of the line. While using the rigged line the user may also wish to attach an additional object to the line without removing the objects already affixed on either end of the line. For example, a user may attach a reel to one end of a line and a hook to the other. After affixing the reel and hook to the line, the user may decide to add weights, a bobber or other device to the line. Preferably, the additional objects could be added to the line without removing the hook or reel from the line. Devices have been described in an attempt to allow for quick attachment to a line.

For example, U.S. Pat. No. 5,987,710 issued to Paul et al. describes a rope securement clip for attaching to a rope. Paul et al. describes a clip having opposite facing sets of teeth that grab the rope, but under extreme rope tension the teeth are described as being specifically designed to be unable to hold the rope and will allow the rope to slip through the teeth. In order to grab the rope the separation distance between the opposite facing teeth must be less than the diameter of the rope. A rope with too small a diameter will pass through the slot without being gripped by the teeth. At column 3 lines 14-28 Paul et al. describes that "an important aspect of the present invention is that under certain rope tension conditions, namely that caused by an entangled whale, the clip 10 will break the connection between the rope 16 and the buoy 14. To this end, the size and the type of the rope 16 and the size, shape, angle of taper and number of the teeth 40 determine the threshold tension at which the clip 10 will allow the rope 16 to be released. For example, the size, shape, angle of taper and number of the teeth 40 can be designed to securely grab a given size and type of rope up to a rope tension of about 50 pounds. For rope tensions above 50 pounds, the teeth 40 as designed will not be able to hold the rope 16 and will allow the free end 20 of the rope 16 to extend back through the teeth 40, the hooks 34 and the buoy loop 18 to break the connection between the rope 16 and the buoy 18." There is a need for an attachment device that attaches and remains affixed to a line independent of the size of rope.

U.S. Pat. Nos. 3,019,545, 5,435,095, 4,459,775, and 6,651,479 each describe fishing sinkers that include opposite facing gripping members that grip the line when the device is compressed thereby reducing the separation distance between the opposite facing gripping members. By compressing the device, the line is pinched which may cause on unwanted stress point in the line. Hence, there is a need for a device that grips a variety of diameter lines without changing the separation distance between opposing teeth.

Other devices have been described for use as fishing sinkers for attachment to a line without threading an end of the line through the sinker. For example, U.S. Pat. Nos. 2,599,973 and 5,239,770 each describe a slip on fishing sinker having a circuitous passageway for threading the line through the sinker. The described circuitous passageways may be difficult to thread the line there through.

Thus, there is a need for a device that is simple, attachable to a line, but may also remain in a fixed position on the line without requiring additional fasteners or pinching of the line. The present invention meets these and other needs that will become apparent from a review of the description of the present invention.

SUMMARY OF THE INVENTION

Without limitation, an advantage of the present invention is to provide a device that quickly attaches to a line without crimping, clamping, wedging, deforming or otherwise pinching the device or a portion of the device to the line. The device of the present invention includes a main body, line receiving member, or central member having a proximal and distal end and a channel, slot, aperture, or central access extending between at least a portion of the proximal end and the distal end. The main body may include projections or at least two opposing line restricting members in the channel and barbs or catches aligned with the channel on at least one of the proximal and distal end of the main body. Other features and advantages of the present invention are further described in the detailed description of the invention. Those skilled in the art will appreciate that the device is particularly well suited for attachment to a fishing line, such that once attached to the line, the line restricting members reduce the ability of the fishing line to slip through the channel. Without limitation, the main body may have a round shape, an elongated shape or other suitable shape, and may be injection molded of metallic material having a thermoplastic binder, a non-toxic material, a buoyant material, or other suitable material.

These and other advantages of the present invention will become readily apparent to those skilled in the art from a review of the description of the preferred embodiment and/or when considered in conjunction with the claims and accompanying drawings in which like numerals in the several views refer to corresponding parts.

DESCRIPTION OF THE DRAWINGS

FIG. 6 is a cross sectional view of the attachment device shown in FIG. 5 taken along line 6-6;

DETAILED DESCRIPTION

Figure 1:
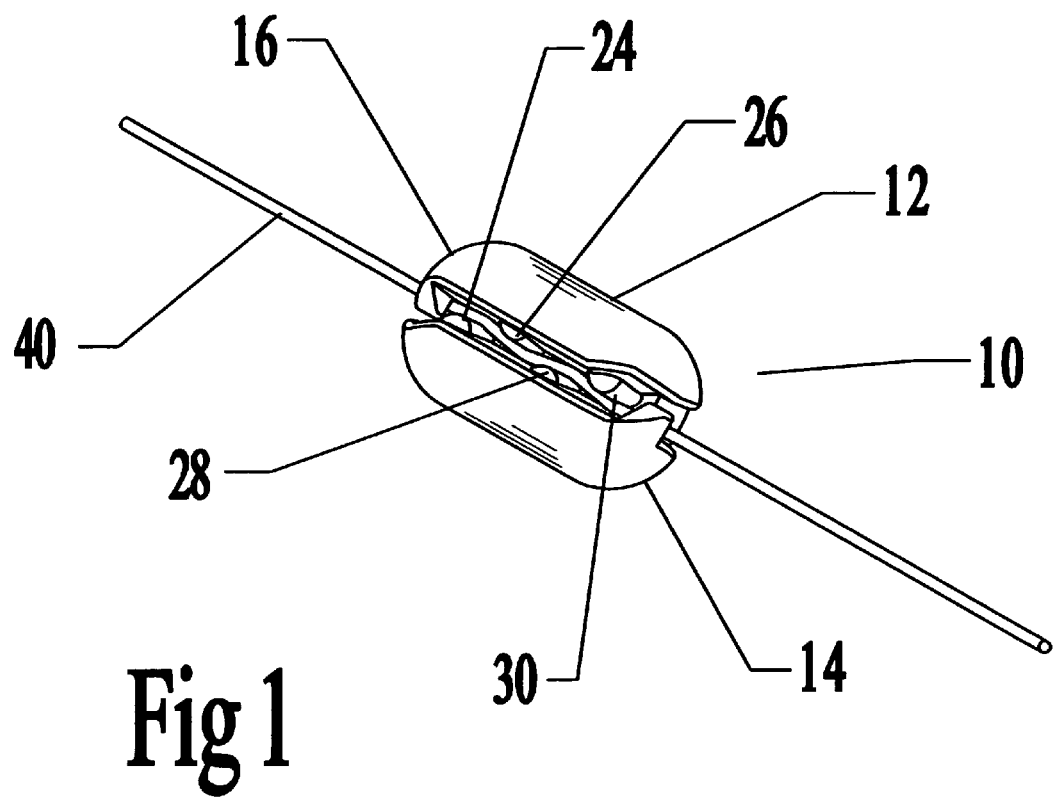
FIG. 1 is a front perspective view of one embodiment of the line attachment device of the present invention engaged to a line.
Figure 2:
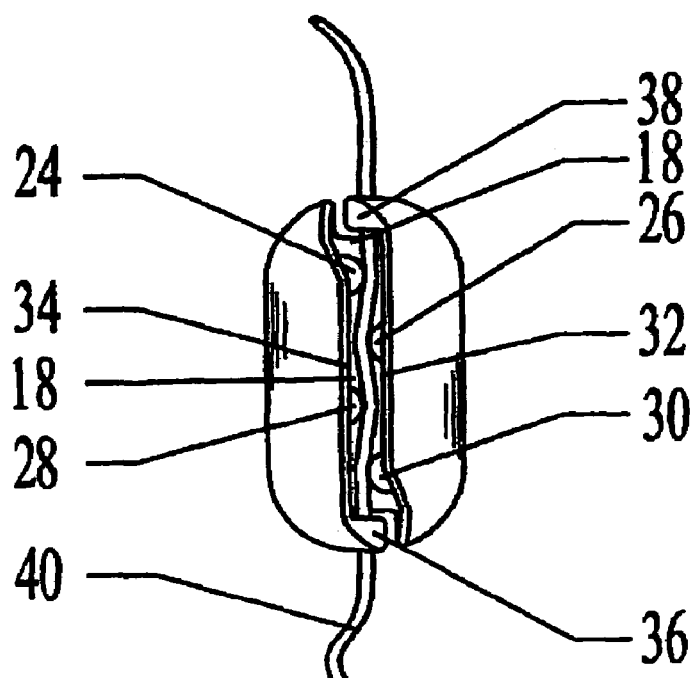
FIG. 2 is a plan view aligned above a slot of the line attachment device shown in FIG. 1.

Those skilled in the art will appreciate that the embodiments of the present invention described herein are exemplary and modifications may be made without departing from the intended scope of the invention. Referring first to FIGS. 1-4 there is shown generally an attachment device 10 of the present invention having a main body 12, first end 14, and second end 16. The main body 12 has an outer surface 22 and an at least partially circuitous aperture 18 extending from the first end 14 to the second end 16. Slot 20 having a first sidewall 32 and opposing second sidewall 34 extends from the outer surface 22 into the main body 12 and intersects the aperture 18. The first sidewall 32 has second and fourth projections 26 and 30 respectively, projecting from the sidewall 32 towards second sidewall 34. Likewise, the second sidewall 34 has offset first and third projections 24 and 28 respectively, projecting from the sidewall 34 towards opposing first sidewall 32.

The projections 24-30 may be conically shaped with the base adjacent the aperture 18. The path of the line 40 around the projections 24-30 is more circuitous near the base of the projections 24-30 and aperture 18 than near the slot 20.

Figure 3:
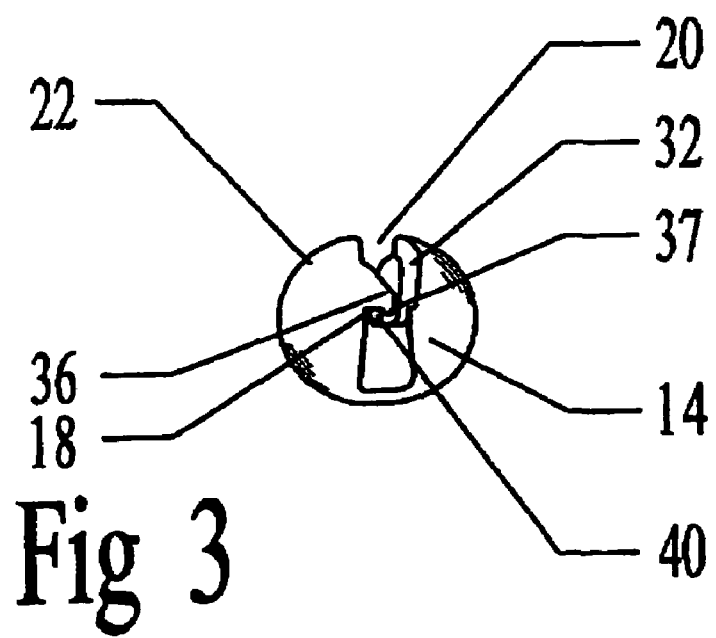
FIG. 3 is an end view of the line attachment device of the type shown in FIG. 1.
Figure 4:
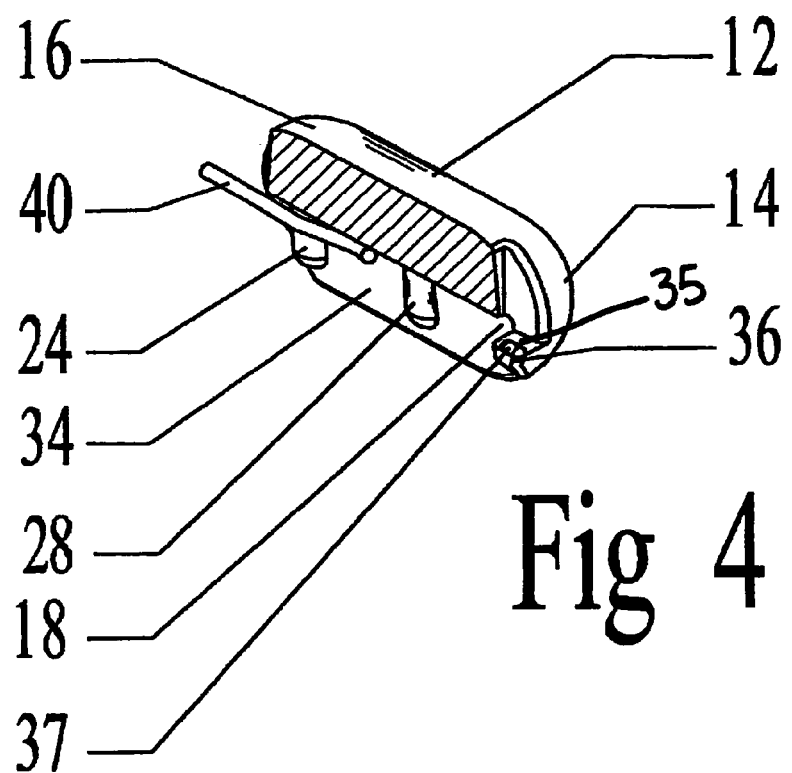
FIG. 4 is a partial sectional perspective view of the line attachment device of the type shown in FIG. 1.
Figure 5:
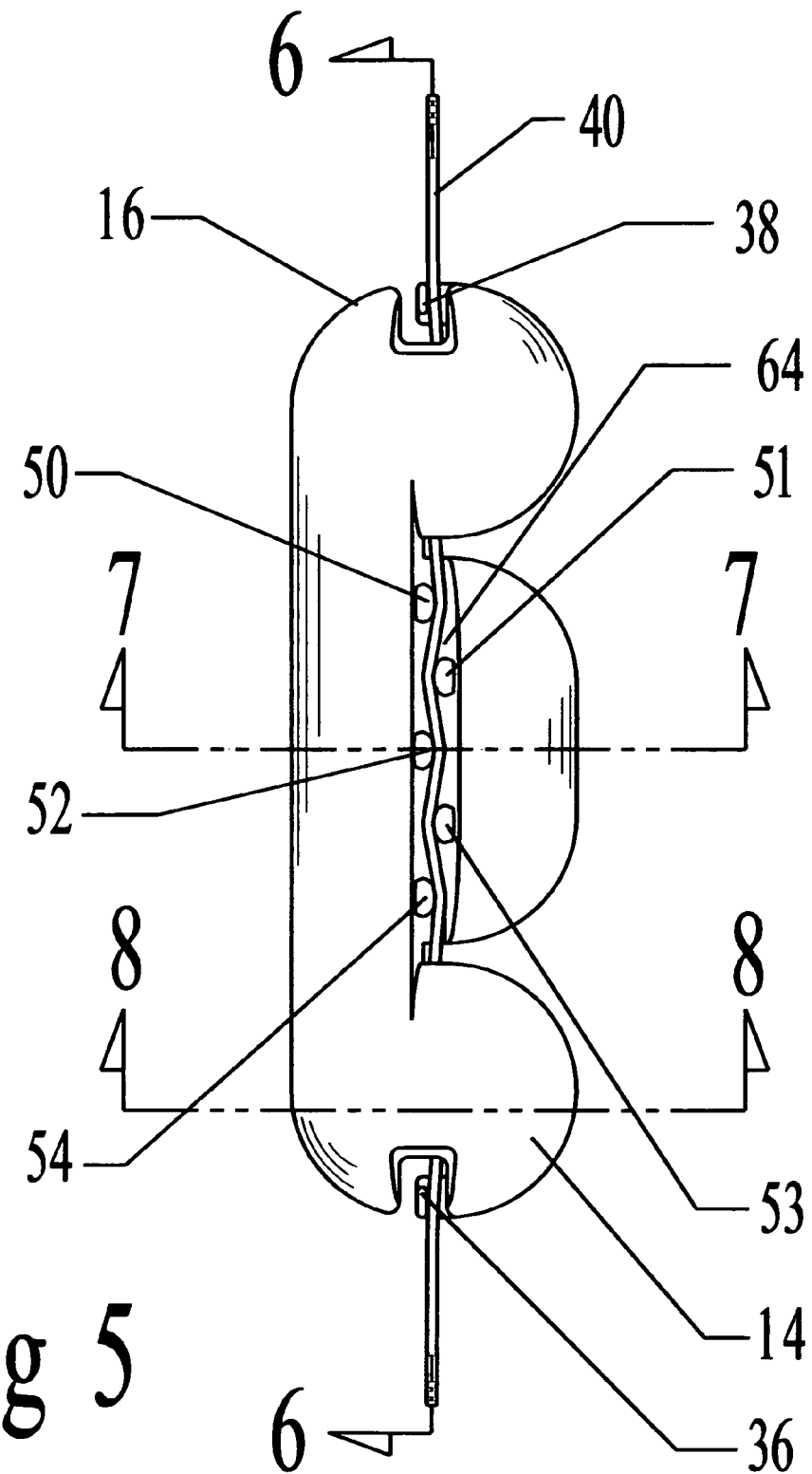
FIG. 5 is a top plan view of an alternate embodiment of the line attachment device of the present invention.
Figure 9:
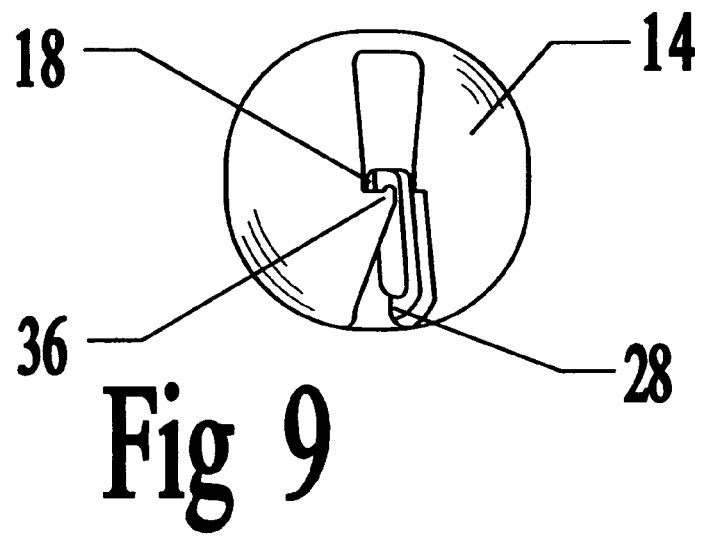
FIG. 9 is an end view of the line attachment device of the type shown in FIG. 5.
Figure 8:
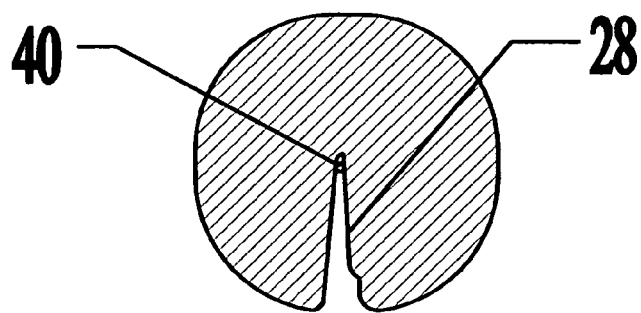
FIG. 8 is a cross sectional view of the attachment device shown in FIG. 5 taken along line 8-8.
Figure 7:
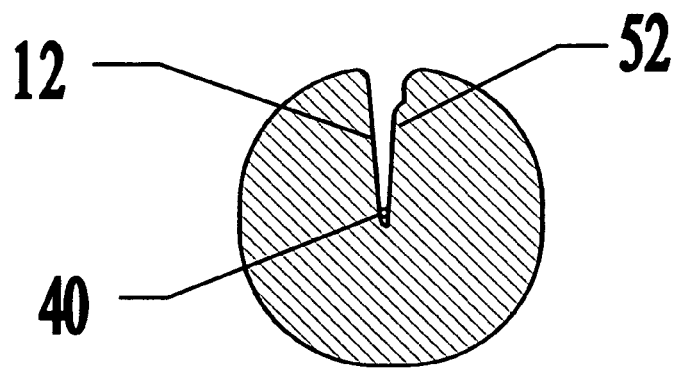
FIG. 7 is a cross sectional view of the attachment device shown in FIG. 5 taken along line 7-7.
Figure 10:
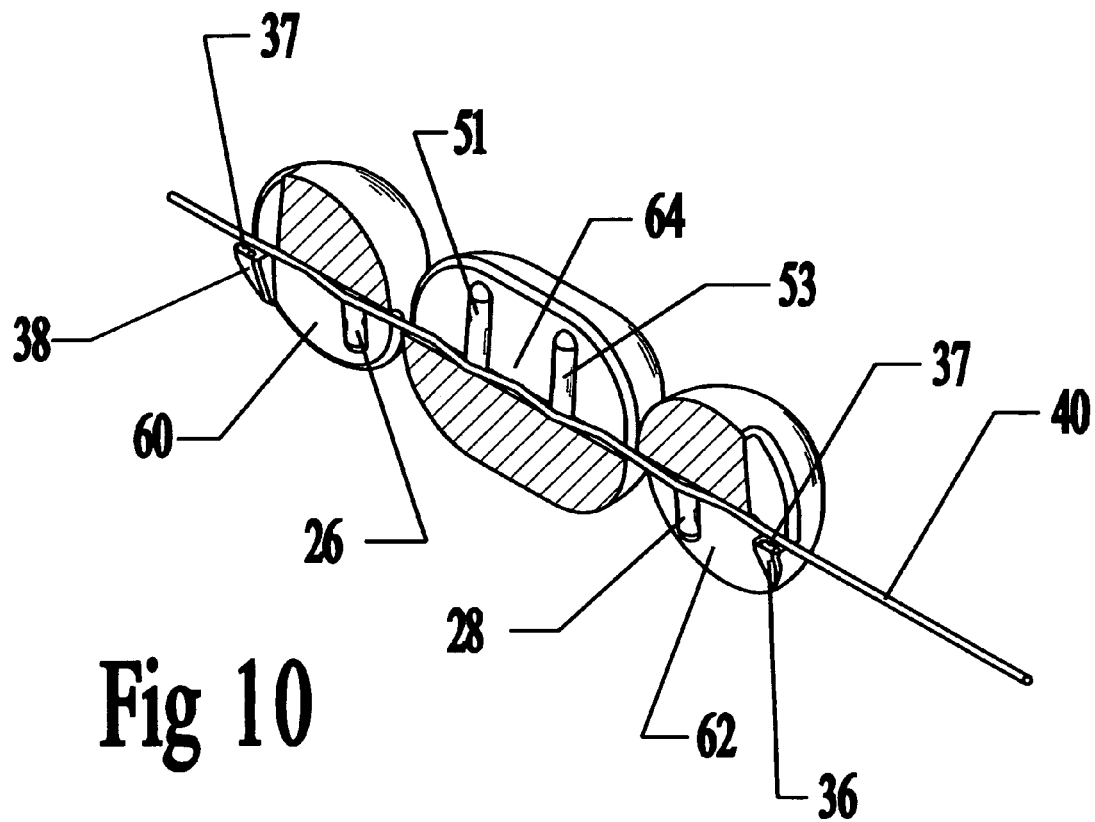
FIG. 10 is a partial sectional perspective view of a first half of the line attachment device of the type shown in FIG. 5.
Figure 11:
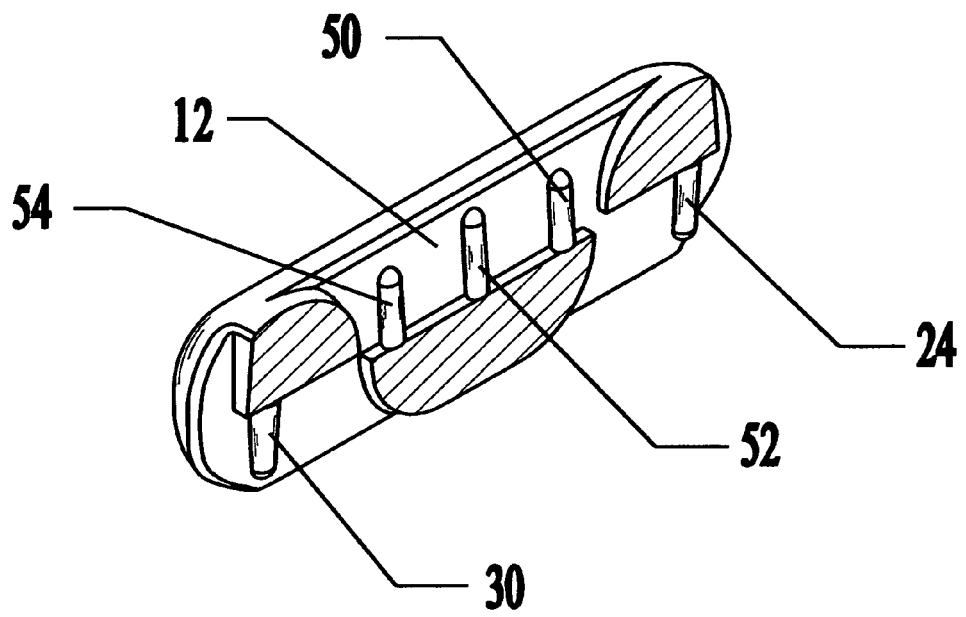
FIG. 11 is a partial sectional perspective view of a second half of the line attachment device of the type shown in FIG. 5.

In other words, as shown in FIG. 6, the base of the projections 24 and 30 are wider than the tip of the projections 24 and 30. FIGS. 3, 8 and 9, show the projections as cylindrical along a major portion of the length of the projection, wherein the sidewall from which it extends is sloped or tapered, to thereby effectively form the partially conical projection with respect to the opposing sidewall and vertical axis of the main member. In other words, as show in FIGS. 2-4, 8, and 9 the partially conical projection has a first distance from the projection to an opposing sidewall 32 or 34 near the outer surface 22 that is greater than a second distance from the projection to the opposing sidewall near the aperture 18 (the path of the line around the projections is more circuitous near the base than at the slot). First end 14 includes first barb 36 and second end 16 includes second barb 38. The barbs 36 and 38 are tapered with a wider portion of the barb 35 near the aperture 18, wherein the wider portion of the barb 35 is a generally planar surface which is located between the slot 20 and aperture 18 and extends both transverse to and between the first 32 and second 34 sidewalls. The line 40 slips down the taper and under the tip of each barb 36 and 38. Each tip of barbs 36 and 38 may have an additional ridge 37 that restricts the line from slipping back around the tip and up the taper. The ridge 37 is a rounded ridge with an outer surface that is approximately half-cylindrical, the rounded ridge 37 being located on an end of the generally planar surface which is furthest from the first 32 and second 34 sidewall from which the respective barb 36, 38 extends. Barbs 36 and 38 restrict the line from slipping out of slot 20, but the line may be removed quickly from the slot 20 by flipping the line 40 around each barb 36 and 38 and pulling the line 40 from the slot 20.

By providing tapered or conical projections 24-30, as the line 40 is inserted in slot 20 and under barbs 36 and 38 the line presses against the projections and the base of the projections grip the line 40. Alternatively, those skilled in the art will appreciate that the projections may be deleted from sidewall 32 or 34 to allow the rope to slip freely through aperture 18 and under barbs 36 and 38 and past barb ridges 37.

Referring next to FIGS. 5-11 an alternate embodiment of the attachment device 10 of the present invention is shown. The alternate embodiment includes several similar features described for the embodiment shown in FIGS. 1-4 and these features are represented by like numerals. Those skilled in the art will appreciate that the various modifications described for the embodiment shown in FIGS. 1-4 may also be made to the embodiment shown in FIGS. 5-11. For example, without limitation, the taper in the projections and barbs may also be incorporated into the embodiment shown in FIGS. 5-11.

The attachment device 10 shown has a main body 12, first end 14, and second end 16. The main body 12 has an outer surface and a slot extending from the outer surface into the main body 12, first end 14 and second end 16 and intersects aperture 18. First end 14 includes first barb 36 and second end 16 includes second barb 38. Barbs 36 and 38 restrict the line from slipping out of tapered locking slot, but the line may be removed quickly from the slot by flipping the line 40 around each barb 36 and 38 and pulling the line 40 from the slot. First end 14 includes opposing third and fourth projections 28 and 30 respectively in the second portion 62 of the slot and second end 16 includes opposing first and second projections 24 and 26 respectively in the first portion 60 of the slot. Main body 12 includes fifth, sixth and seventh projections 50, 52, and 54 respectively and opposing eighth and ninth projections 51 and 53 respectively in the third portion 64 of the slot Line 40 threads around the projections in the first, second and third portions 60, 62, and 64 of the slot.

Figure 12:
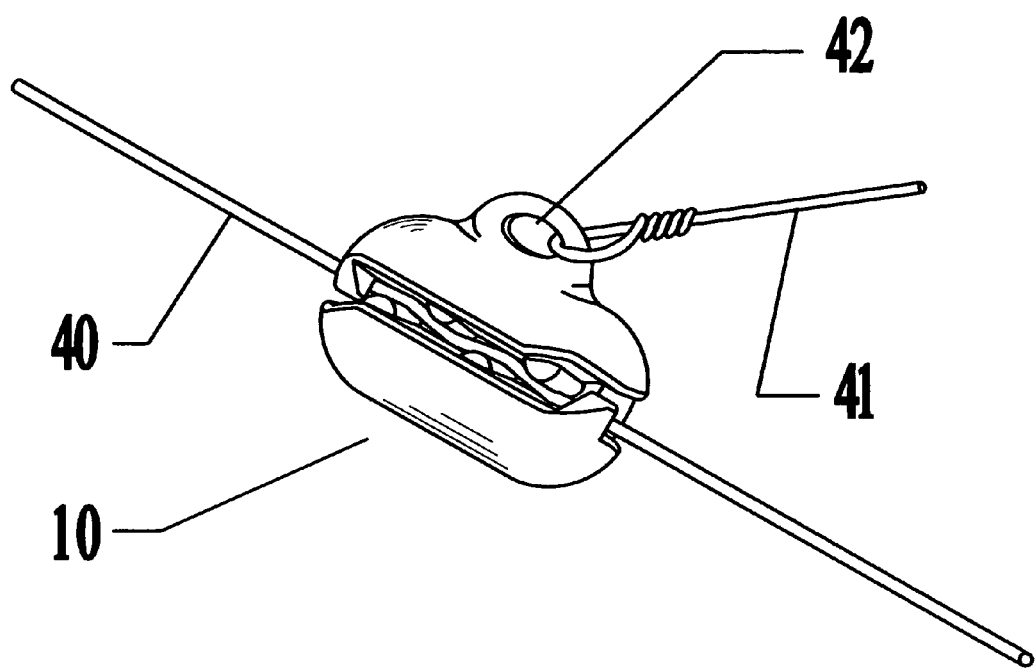
FIG. 12 is a perspective view of an alternate preferred embodiment of the line attachment device of the present invention.

FIG. 12 shows an attachment device 10 of the present invention similar to that shown in FIGS. 1-4, further including an eyelet 42 extending outwardly from outer surface 22 of the main body 12. The eyelet 42 is positioned approximately opposite the slot 20 and second line 41 is shown secured to eyelet 42. When tension is applied to line 41 barbs 36 and 38 inhibit line 40 from slipping out of slot 20. Those skilled in the art will appreciate the many uses for attachment device 10 capable of fixed attachment to a line 41 and quick attachment or removal to another line 40.

Those skilled in the art will appreciate that the present invention may attach to a fishing line, such that once attached to the line, the line restricting members reduce the ability of the fishing line to slip through the channel. Without limitation, the main body may have a round shape, an elongated shape or other suitable shape, and may be injection molded of metallic material having a thermoplastic binder, a non-toxic material, a buoyant material, or other suitable material. The density of the material and size of the member may be selected to create the member having a desired weight. For example, without limitation, non-toxic fishing weights may be created in the varying sizes including double buck, ¼ ounce, ³⁄₁₆ ounce, etc.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A device attachable to a line, the device comprising:
an elongate generally cylindrical solid member having first and second opposite outer ends, a longitudinal axis defined between the first and second opposite outer ends, an aperture for receiving a line extending through the solid member along a portion of the longitudinal axis, opposed first and second sidewalls defining the aperture and further defining a slot extending axially along a length of the solid member and further extending laterally from the aperture to an outer surface of the solid member, the first sidewall and the outer surface of the solid member forming a first edge, the second sidewall and the outer surface of the solid member forming a second edge, the first and second edges rounded such that they form smooth rounded surfaces going from the outer surface of the solid member to the aperture; the solid member further including projections having respective bases adjacent the aperture, the projections comprising a first projection on the first sidewall projected toward the second sidewall and a second projection on the second sidewall projected toward the first sidewall, the first and second projections further extending outwardly from their respective bases toward the outer surface, wherein the first and second projections are tapered such that a lateral spacing between the first and second projections and their respective opposing sidewalls decreases progressively from the outer surface to their respective bases, wherein the projections are offset from one another in a direction along the longitudinal axis of the solid member and thereby adapted to shape a line into a circuitous path around the projections when the line is contained in the aperture; the solid member further including first and second barbs near the first and second outer ends respectively, each barb extending from one of the first and second sidewalls towards the other of the first and second sidewalls and cooperating with said other of said first and second sidewalls to form a gap adapted to admit insertion of the line laterally into the aperture, wherein a tip of each of the barbs includes a rounded ridge adjacent the aperture that extends in a direction approximately parallel to the first and second sidewalls, each tip adapted to retain the line against lateral movement out of the aperture, a widest portion of each barb comprising a generally planar surface which is located between the slot and the aperture, the generally planar surface extending both transverse to and between the first and second sidewalls, each of the barbs tapering from the widest portion toward the slot, and wherein the rounded ridge is located on an end of the generally planar surface which is furthest from the respective sidewall from which the respective barb extends.

2. The device as recited in claim 1, wherein each of the projections is tapered with respect to its associated sidewall.

3. The device as recited in claim 1, wherein said device is attachable to a fishing line, such that once attached to the line, the line is restricted within the aperture by the barbs.

4. The device as recited in claim 1, wherein said device is made from a non-toxic material.

5. The device as recited in claim 1, wherein the projections create friction and grip the line without requiring a clamping force to the line.

6. The device as recited in claim 1, wherein said device is injection molded of metallic material having a thermoplastic binder.

7. The device of claim 1 wherein:
the first projection is disposed proximate the first outer end, and the first barb extends from the second sidewall toward the first sidewall.

8. The device of claim 1 wherein:
the first and second projections have truncated conical surfaces of increasing diameter in a direction from the outer surface to their respective bases.

9. The device of claim 1 wherein:
the first projection is disposed proximate the first outer end, the first barb extends from the second sidewall toward the first sidewall, and the second barb extends from the first sidewall toward the second sidewall.

10. The device of claim 1 wherein the rounded ridge comprises an outer surface that is approximately half-cylindrical.

* * * * *